United States Patent
Johnson et al.

(10) Patent No.: US 7,783,662 B2
(45) Date of Patent: Aug. 24, 2010

(54) FEDERATED INFORMATION MANAGEMENT

(75) Inventors: Sandra K. Johnson, Cary, NC (US); Joan LaVerne Mitchell, Longmont, CO (US); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/935,497

(22) Filed: Nov. 6, 2007

(65) Prior Publication Data
US 2009/0119340 A1    May 7, 2009

(51) Int. Cl.
*G06F 17/30* (2006.01)
(52) U.S. Cl. .................................... 707/781
(58) Field of Classification Search .............. 707/2, 707/200, 781; 709/229
See application file for complete search history.

(56) References Cited

U.S. PATENT DOCUMENTS

| | | | |
|---|---|---|---|
| 5,613,113 A | 3/1997 | Goldring | |
| 6,662,230 B1 * | 12/2003 | Eichstaedt et al. | 709/229 |
| 6,988,171 B2 | 1/2006 | Beardsley et al. | |
| 7,263,076 B1 * | 8/2007 | Leibovitz et al. | 370/310 |
| 2004/0215909 A1 | 10/2004 | Imai et al. | |
| 2004/0267572 A1 * | 12/2004 | Emery et al. | 705/2 |
| 2006/0004702 A1 | 1/2006 | St. John et al. | |
| 2006/0117294 A1 * | 6/2006 | Vogler | 717/104 |
| 2006/0280048 A1 | 12/2006 | Jung et al. | |
| 2007/0124278 A1 | 5/2007 | Lewis et al. | |

OTHER PUBLICATIONS

Coordinating Backup/Recovery and Data Consistency Between Database and File Systems Author: Suparna Bhattacharya; Golden Enclave; C. Mohan; Karen W. Brannon; Inderpal Narang Hui-I Hsiao; Mahadevan Subramanian Source: International Conference on Management of Data; ACM Date: 2002.

* cited by examiner

*Primary Examiner*—Etienne P LeRoux
(74) *Attorney, Agent, or Firm*—David A. Mims; Robert C. Rolnik (57) ABSTRACT

A method for management of federated information in associated knowledge systems. The method includes maintaining a data structure, the data structure including associative metadata that correlates a plurality of substantive knowledge entities from a plurality of disparate knowledge bases; monitoring the substantive knowledge entities for an access-limiting event; determining the access-limiting event on at least one of the substantive knowledge entities; and responsive to determining the access-limiting event, adding to the associative metadata a persistent audit enhancement indicative of the access-limiting event, the persistent audit enhancement including a timestamp. The access-limiting event may include deletion of a substantive knowledge entity, enacting more restrictive access permissions for a substantive knowledge entity, and copying of a substantive knowledge entity to a more restrictive access area.

20 Claims, 5 Drawing Sheets

FEDERATED INFORMATION MANAGEMENT

FIELD OF INVENTION

The present invention generally relates to federated information management. More specifically, the invention relates to tracking management of federated information in associated knowledge systems.

BACKGROUND OF THE INVENTION

Recent history has seen great improvements in the storage and organization of information. Particularly noteworthy are the advances in data storage using computer-based archival systems. However, the increase in the amount and variety of information stored in electronic format has resulted in new problems. Finding relevant information may require sorting through a vast collection of files, documents, code segments, and so on (collectively 'substantive knowledge entities') located in disparate knowledge systems to find information pertaining to a particular problem or task.

For example, in the software industry, a particular software project may have several stages. At the beginning, the project is designed and implemented in code form. This development stage is followed by a test stage. The completed software is then sold and possibly tailored to each customer according to the customer's specific needs. After the sale, the developer provides technical support, including the development of software fixes to resolve errors.

Typically, each of these stages is negotiated by an autonomous business unit isolated from the business units managing the software in other stages. Each stage may include several phases, with each phase being executed by one of several smaller business units, which often act in isolation as well. The software test stage, for example, typically includes the phases unit test, functional verification test, system test, integration, performance and service test, each of which is done independently.

Typically, each of the phases generates knowledge in the form of substantive knowledge entities which are stored in a knowledge base specific to the phase. However, data from each phase is known only to the business unit that carries out that phase, so that knowledge is not carried over to subsequent phases.

Recent advances in the art have attempted to resolve these difficulties. One approach of the prior art is to replicate the substantive knowledge entities to one or more shared repositories. This approach requires safeguards to ensure that information in the shared repositories is consistent with information in the knowledge bases, which can be complex to implement, error-prone, and costly.

It is therefore a challenge to develop strategies for management of federated information in associated knowledge systems to overcome these, and other, disadvantages.

SUMMARY OF THE INVENTION

A first embodiment of the present invention is a method for management of federated information in associated knowledge systems. The method includes maintaining a data structure, the data structure including associative metadata that correlates a plurality of substantive knowledge entities from a plurality of disparate knowledge bases; monitoring the substantive knowledge entities for an access-limiting event; determining the access-limiting event on at least one of the substantive knowledge entities; and responsive to determining the access-limiting event, adding to the associative metadata a persistent audit enhancement indicative of the access-limiting event, the persistent audit enhancement including a timestamp. The access-limiting event may include deletion of a substantive knowledge entity, enacting more restrictive access permissions for a substantive knowledge entity, and copying of a substantive knowledge entity to a more restrictive access area.

A second embodiment of the present invention is a computer usable medium including computer readable code for management of federated information in associated knowledge systems. The medium includes computer readable code for maintaining a data structure, the data structure including associative metadata that correlates a plurality of substantive knowledge entities from a plurality of disparate knowledge bases; computer readable code for monitoring the substantive knowledge entities for an access-limiting event; computer readable code for determining the access-limiting event on at least one of the substantive knowledge entities; and computer readable code for adding to the associative metadata a persistent audit enhancement indicative of the access-limiting event responsive to determining the access-limiting event, the persistent audit enhancement including a timestamp.

A third embodiment of the present invention is a system for management of federated information in associated knowledge systems. The system includes a processor; a computer memory operatively coupled to the computer processor; and a communications adapter operatively coupled to said processor and said computer memory. The communications adaptor connects the system through a network to a plurality of disparate knowledge bases storing a plurality of substantive knowledge entities. The computer memory has disposed within it computer program instructions for maintaining a data structure, the data structure including associative metadata that correlates the plurality of substantive knowledge entities from the plurality of disparate knowledge bases. The computer memory also has disposed within it computer program instructions for adding to the associative metadata a persistent audit enhancement indicative of an access-limiting event responsive to a determination of the access-limiting event on at least one of the substantive knowledge entities. The persistent audit enhancement includes a timestamp.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Disclosed herein are methods, systems, and computer readable media for management of federated information in associated knowledge systems. Aspects of the present invention facilitate sharing of information across multiple disparate knowledge systems to achieve an objective.

One embodiment includes maintaining an infrastructure designed to provide associations between knowledge entities in disparate knowledge systems that are related. One way in which the knowledge entities may be related is by being spawned by the same project, though possibly in different phases. A thin layer of associative metadata in a repository provides logical connections to and from the related knowledge entities. The infrastructure may be useful for, among other things, leveraging associations between the substantive knowledge entities to locate entities connected with a particular project. In some embodiments, changes to substantive knowledge entities are tracked by adding enhancements to the associative metadata. Even after the deletion of a substantive knowledge entity, this enhancement, or the associative metadata generally, may be stored for a prolonged period of time, such as months or years.

Figure 1:
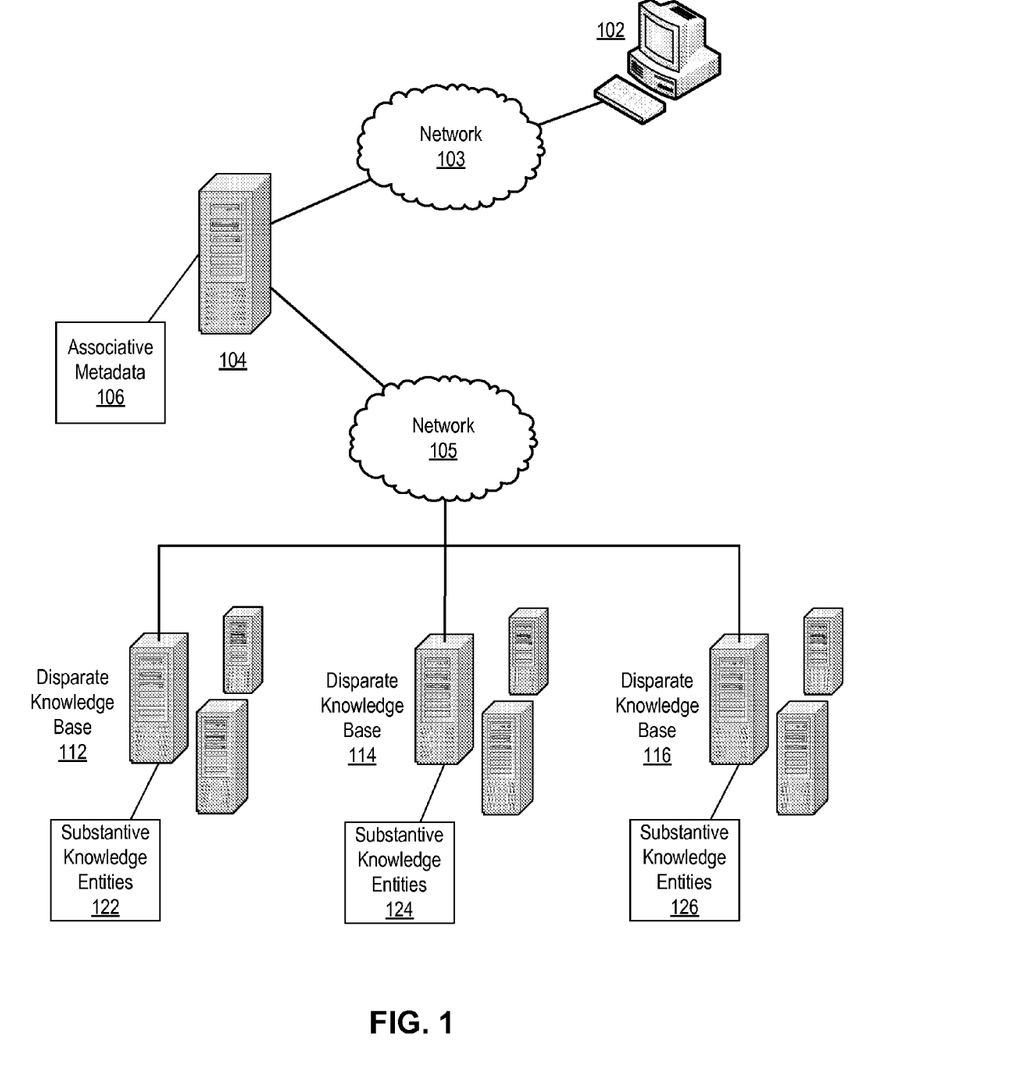
FIG. 1 illustrates an embodiment of a system for management of federated information in associated knowledge systems in accordance with the present invention.

FIG. 1 illustrates an embodiment of a system for management of federated information in associated knowledge systems in accordance with the present invention. The system of FIG. 1 includes data repository 104 connected to disparate knowledge bases 112-116 through a network 105.

Knowledge bases 112-116 are machine-readable resources for the dissemination of information (e.g., databases) along with any computer hardware or software components for storing or managing the resources as would occur to one of skill in the art. Knowledge bases 112-116 contain information in the form of substantive knowledge entities 122-126, such as files, documents, programs, and the like.

Data repository 104 may include any database management system ('DBMS') known in the art. Data repository 104 stores associative metadata 106 connecting substantive knowledge entities 122-126 on disparate knowledge bases 112-116. Data repository 104 may be implemented as any of various database architectures that are well known in the art, such as a storage area network ('SAN'), direct attached storage ('DAS'), or network-attached storage ('NAS').

Data repository 104 is also connected to a computing device 102 through a network 103 and configured to allow users at a computing device 102 to access associative metadata 106 in the data repository 104 to find links to the substantive knowledge entities and other information. In the system of FIG. 1, computing device 102 could be a desktop computer, a server, a smart phone, a personal digital assistant ('PDA'), a laptop computer, or any other computing device capable of accessing the repository 104 as would occur to one of ordinary skill in the art.

Data repository 104 may be at a location remote from the knowledge bases 112-116. In some aspects, the remote location is a physically restricted site. Additional security measures such as requiring passwords, using identity authentication, and the like may be required to delete associative metadata 106, or the capability to make changes in the data repository 104 may be restricted to particular users.

Networks 103 and 105 may include, alone or in combination, one or more local area networks ('LANs'), wide area networks ('WANs'), wired or cellular telephone networks, intranets, or the Internet. In some implementations, network 103 and network 105 may be the same network.

The system architecture of the present invention may differ from that shown in FIG. 1 while remaining within the scope of the invention, such as by having repository 104 at two or more sites, by using more or fewer components, and so on. The exemplary components disclosed in reference to FIG. 1 are provided for illustration and not for limitation.

Figure 2:
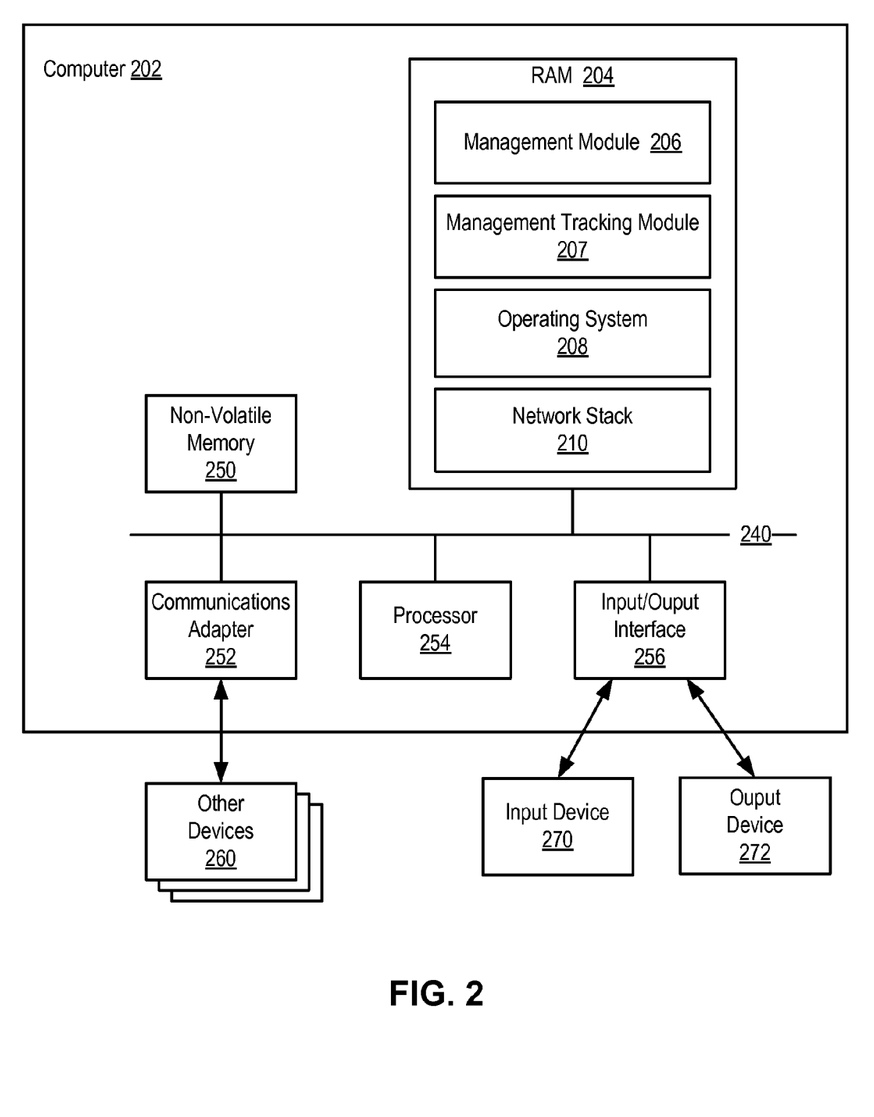
FIG. 2 illustrates an embodiment of a computer for management of federated information in associated knowledge systems in accordance with the present invention.

Embodiments of the presently disclosed invention are implemented to some extent as software modules installed and running on computers. FIG. 2 sets forth a step diagram of an exemplary computer 202 of the present invention. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory is connected through a system bus 240 to the processor 254 and to other system components. Thus, the software modules are program instructions stored in computer memory.

An operating system 208 is stored in computer memory. Operating system 208 may be any appropriate operating system such as Windows XP, Windows Vista, Mac OS X, UNIX, LINUX, or OS/2 from International Business Machines Corporation (Armonk, N.Y.). A network stack 210 is also stored in memory. The network stack 210 is a software implementation of cooperating computer networking protocols to facilitate network communications. Also stored in computer memory is a federated information management module 206.

Federated information management module functionality is different between knowledge bases 112-116 and repository 104, described in FIG. 1. Federated information management module 206 on knowledge bases 112-116, running as an application in the operating system environment, collects project identity information through a menu-driven wizard and creates associative metadata including project identity metadata. Federated information management module 206 sends the associative metadata to repository 104 through network 105 via network stack 210. The federated information management module 206 contains graphical user interface ('GUI') components for creation of substantive knowledge entities for the project. As substantive knowledge entities are created, federated information management module for knowledge bases 112-116 sends link information as well as other hierarchical and entity characteristic information to repository 104 via network stack 210.

Federated information management module 206 on repository 104 stores associative metadata 106 in a data structure. As link information from knowledge bases 112-116 is received, federated information management module 206 on repository 104 adds links to the substantive knowledge entities to the associative metadata 106.

In some embodiments, federated information management tracking module 207 on knowledge bases 112-116 (operating on the operating system level, below the operating system level, or incorporated as part of a DBMS) monitors the substantive knowledge entities for an access-limiting event (i.e., an event that indicates access to a substantive knowledge entity is being curtailed). In response to determining the access-limiting event, federated information tracking management module 207 on repository 104 adds to the associative metadata a persistent audit enhancement indicative of the access-limiting event.

In alternate embodiments, the computer readable code above may be installed entirely in the federated information management modules 206 and federated information management tracking modules 207 on each knowledge base 112-

116, or alternatively on repository 104. The federated information management tracking module 206 on knowledge bases 112-116 or repository 104 may also include a DBMS, file system, or other program code for data storage management.

Computer 202 also includes one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computer 202 also includes a communications adapter 252 for implementing data communications with other devices 260. Communications adapter 252 implements the hardware level of data communications through which one computer sends data communications to another computer through a network.

Although the invention is described above in terms of a computer, portions of the invention could be implemented as any viable computing device including logic and memory as will occur to one of ordinary skill in the art, including devices where logic is implemented as field-programmable gate arrays ('FPGAs'), application-specific integrated circuits ('ASICs'), and the like.

The structure of the associative metadata may be such that each project is a single entry containing a linked list that points to each associated substantive knowledge entity. The creation of such associative metadata is discussed in regards to FIG. 3 below.

Figure 3:
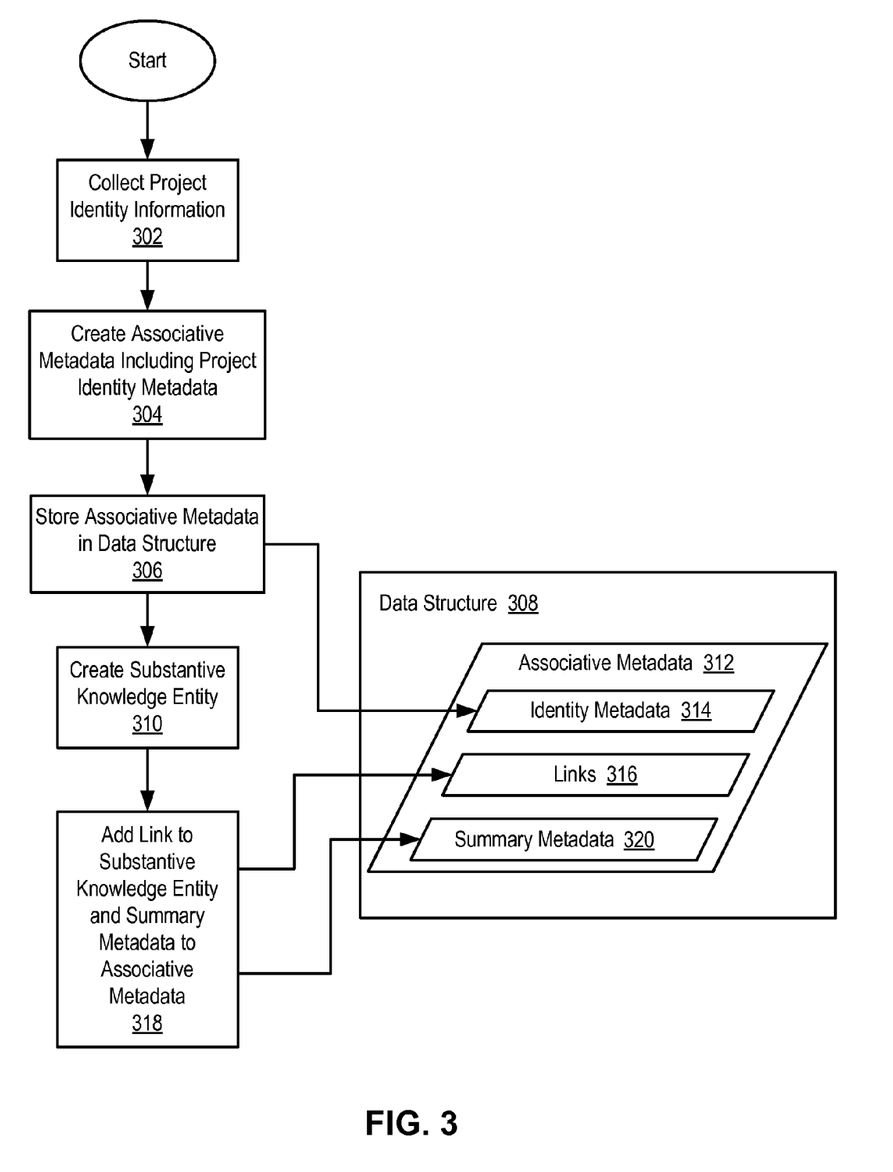
FIG. 3 illustrates an embodiment of a method for management of federated information in associated knowledge systems in accordance with the present invention.

FIG. 3 is a flow chart illustrating an embodiment of a method for management of federated information in associated knowledge systems in accordance with one aspect of the invention. The method begins at step 302 with the knowledge bases 112-116 collecting project identity information (step 302). Collecting the information may be carried out through the use of a menu-driven wizard or web site.

The next step of the method is creating associative metadata 312 including the project identity metadata 314 (step 304). Associative metadata 312 is metadata that logically connects the substantive knowledge entities created under a particular project. Creating associative metadata 314 may be carried out by parsing project identity information. For example, the information may be stored initially using a markup language, such as, for example, XML, and then parsed to store the data in a database or to convert it into a preferred format for transmission.

In FIG. 3, the associative metadata 312 is created in one of the disparate knowledge bases and then sent to data repository 104. However, some aspects of the invention provide for the information to be transmitted to the data repository, which then creates the associative metadata 312. For example, one aspect of the invention is implemented as a web based application, where information is transmitted (using an HTTP session, for example) to the data repository 104, which parses the information to create associative metadata 312. At step 306, the data repository 104 stores associative metadata 306 including project identity metadata 314 in data structure 308.

After the project is created, knowledge bases 112-116 create one or more substantive knowledge entities related to the project (step 310). In one aspect, as each substantive knowledge entity is created, the disparate knowledge bases 112-116 send link information, summary information, and information indicating the project to which the entity belongs to a data repository 104.

For each substantive knowledge entity, data repository 104 adds a link 316 to the substantive knowledge entity, as well as summary metadata 320, to the associative metadata 308 (step 318) for the appropriate project. The links may be implemented as pointers, addresses, or any other link types known to those of ordinary skill in the art. Summary metadata 320 is metadata summarizing the project, characteristics of the substantive knowledge entity, and the relation of the substantive knowledge entity to the project. Summary metadata 320 may include the stage or phase spawning the entity, the current phase of the project, timestamps for entering or exiting a particular phase, and an entity's creation date, update dates, authors, and so on.

After the completion of the above steps, associative metadata 312 for each project includes identity metadata 312, summary metadata 320, and links 316 to substantive knowledge entities related to the project. In some aspects of the invention, associative metadata may contain other hierarchical or business associative information.

For further illustration, consider the exemplary associative metadata below. For convenience, the enhancement is written in pseudocode.

```
project_name: Xyzzy Project
project_description: text-to-speech extension of Project Foo solution
project_information: *infoptr
project_resource_type: report
struct    project_process {
          project_phase: FVT;
          project_phase_enter: 200401200818;
          project_phase_exit: 200402030818;
          project_phase_manager: Bob Watson
          }
project_ske_link[*skeptr]
project_support_history[*bugptr]
```

In the exemplary data structure above, associative metadata is stored in an entry created for a specific project. The project name "Xyzzy Project," is stored as a value for the attribute "project_name." The attribute "project_description" stores a text description of the project as its attribute value: "text-to-speech extension of Project Foo." The attribute "project_information" stores a pointer to specific information about the project, such as the program specification, code objectives, and so on. The value of "report" for the attribute "project_resource_type" indicates the type of substantive knowledge entity. Other substantive knowledge entities include test data, test script, test suite, email, webcast, blog, audio file, video file, RSS feed, test coverage, and so on. The value "FVT" for the attribute "project phase" indicates the phase that parented the subjective knowledge entity. Both the attributes "project_phase_enter" and "project_phase_exit" have timestamps as attributes, indicating the time the phase began and ended. The value "Bob Watson" for the attribute "project_phase_manager" indicates the manager overseeing the listed phase. The data structure "project_ske_link" contains links to the substantive knowledge entity. The data structure "project_support history" contains links to additional structures containing software error discovery and correction.

Due to the vast nature of the infrastructure, many users may have access to at least some of the substantive knowledge entities associated by the metadata. Some users may alter substantive knowledge entities for malicious purposes. For example, in economic warfare, individuals may deliberately delete important documents or test results. Some embodiments therefore include an audit functionality for an auditor to review and detect users improperly limiting access to a knowledge entity by deleting or obscuring the knowledge entity. This functionality may also be used to track changes in substantive knowledge entities for non-malicious purposes.

Figure 4:
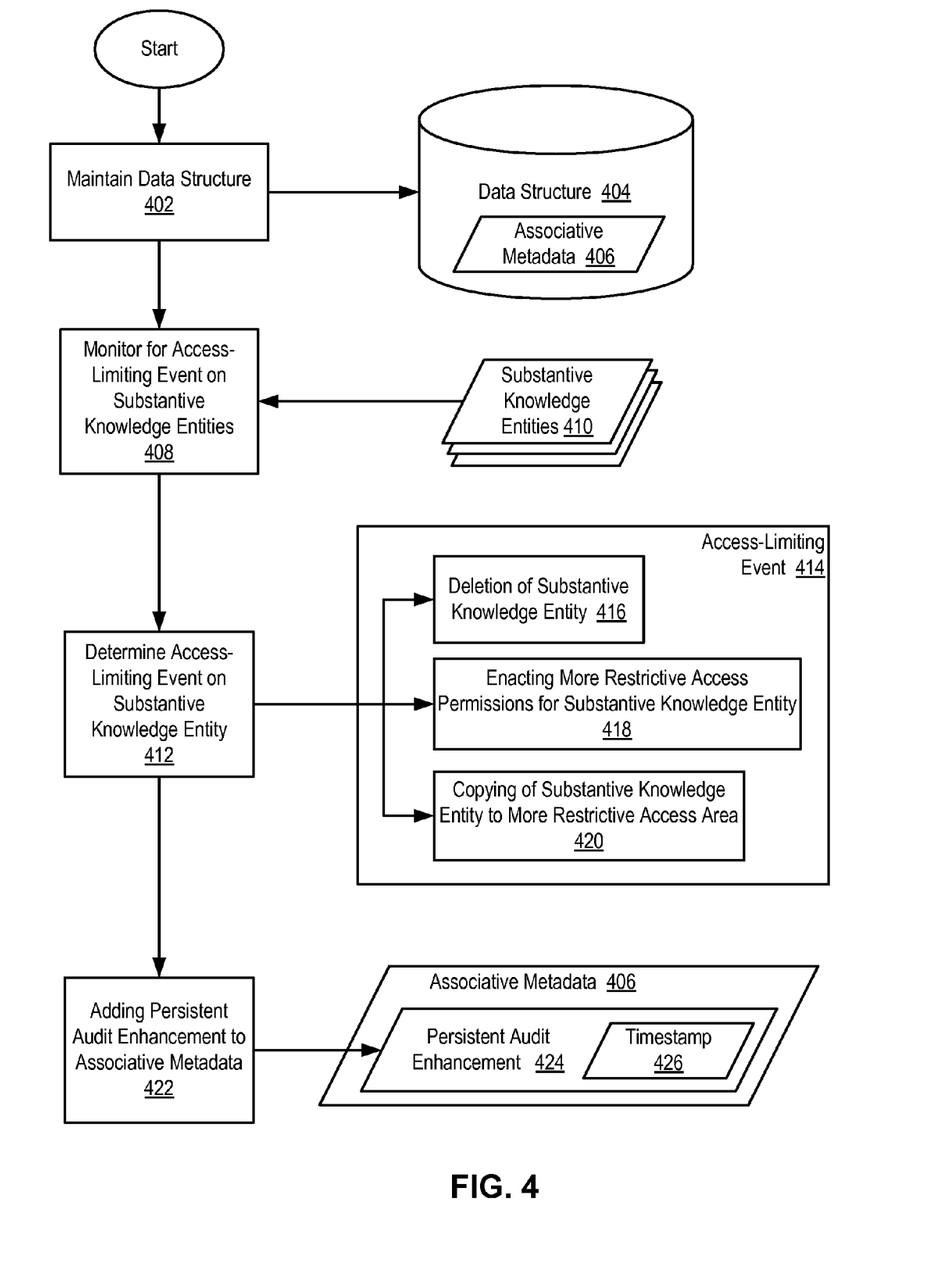
FIG. 4 illustrates another embodiment of a method for management of federated information in associated knowledge systems in accordance with the present invention.

FIG. 4 is a data flow diagram illustrating an embodiment of a method for tracking management of federated information in associated knowledge systems in accordance with one aspect of the invention. The method of FIG. 4 begins at step 402 by maintaining a data structure 404. The data structure 404 includes associative metadata 406 that correlates a plurality of substantive knowledge entities from a plurality of disparate knowledge bases, as described above in reference to FIG. 2.

In the method of FIG. 4, maintaining a data structure 404 may include persistently maintaining a portion of the associative metadata 406 that correlates a plurality of particular substantive knowledge entities 410 after deletion or change in access rights of one or more of the plurality of particular substantive knowledge entities 410. Persistently maintaining metadata is defined here as archiving the metadata for an extended period, regardless of the deletion of a related substantive knowledge entity. This extended period may be months or years, or until the occurrence of a specific event, such as, for example, a periodic audit of the persistent audit enhancements by an auditor. In some instances, all associative metadata 406 pertaining to deleted entities (or entities whose access has been restricted) is persistently maintained. Thus, even if the substantive knowledge entity is deleted or its access has been restricted, additional information about the document is still available as associative metadata 406. In addition to persistently maintaining the existing associative metadata, the method of the present invention also enhances the metadata as discussed below.

The method continues in step 408 by monitoring for an access-limiting event on the substantive knowledge entities. An access-limiting event is any event that indicates access to a substantive knowledge entity is being curtailed. In FIG. 4, access-limiting events include deletion of a substantive knowledge entity, enacting more restrictive access permissions for a substantive knowledge entity, and copying a substantive knowledge entity to a more restrictive access area. Generally, the event may be a specific command line entry (such as, for example, a delete command) or a mouse-click on a specific icon. Monitoring may be carried out by the use of interrupt handlers or polling.

Step 412 includes determining the access-limiting event on at least one of the substantive knowledge entities. This step may be carried out by event sources signaling event occurrences to event subscribers. In one aspect, the event source occurs on one of the knowledge bases.

Responsive to determining the access-limiting event, the repository adds to the associative metadata 406 a persistent audit enhancement 424 (step 422). Persistent audit enhancement 424 is metadata indicative of the access-limiting event 414 that is persistently maintained, as described above. The persistent audit enhancement 424 includes a timestamp 426 (step 422) indicating when the access-limiting event occurred. Adding the persistent audit enhancement 424 may be carried out by adding additional metadata to an existing persistent audit enhancement.

In one aspect of the invention, adding the persistent audit enhancement 424 may be implemented by altering the file deletion call of a DBMS's application program interface ('API') to include system calls for adding the persistent audit enhancement 424 to associative metadata 406. The step of adding the persistent audit enhancement 424 could alternatively be carried out by an event handler triggering additional events.

Figure 5:
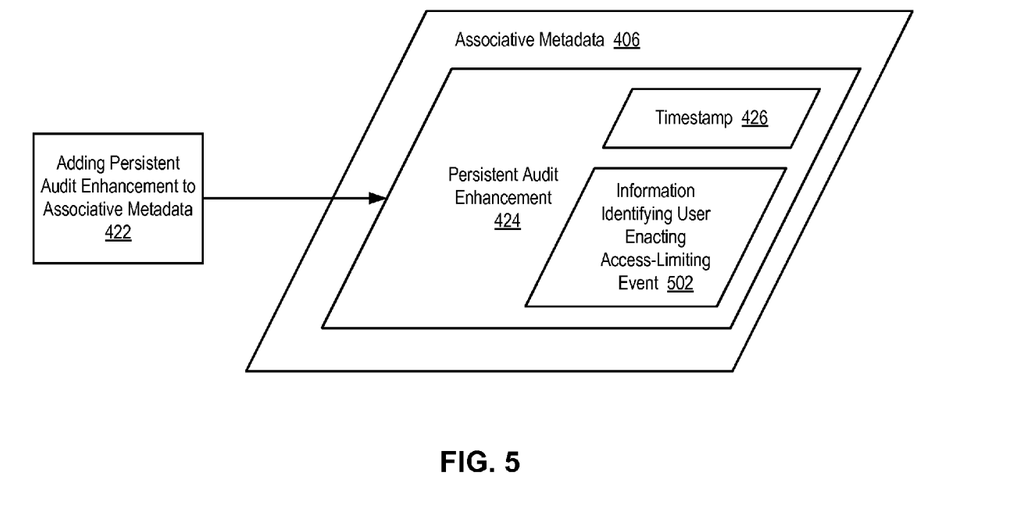
FIG. 5 illustrates an embodiment of a persistent audit enhancement in accordance with the present invention.

It may be beneficial to know additional information about the access-limiting event. For example, information about users enacting the access-limiting event may be obtainable. Therefore, in some implementations, the step of adding a persistent audit enhancement 424 (step 422) may include storing additional information in the persistent audit enhancement 424. FIG. 5 illustrates a persistent audit enhancement 424 including both a timestamp 426 and information identifying the user enacting the access-limiting event 502. This information may include a user name, an identification number, a machine-specific address, a network address, or any other identifying characteristic as will occur to those of skill in the art.

For further illustration, consider the exemplary persistent audit enhancement below. For convenience, the enhancement is written in pseudocode.

```
individual_info_struct {
        name: Ned Baker;
        identification_no.: 999999999;
        ...
} individual_info;
entity_access_limit_struct {
        entity_deletion_timestamp: 200501200818
        entity_restricted_access_timestamp: 200501010712;
        entity_change_initiator: individual_info;
}
```

In the exemplary enhancement above, individual information is stored in the data structure "individual_info_struct." The personal information includes the full name of the initiator of the access change, "Ned Baker" and his identification number, "999999999." In other implementations, the data structure "individual_info_struct" may include a user ID (such as, for example, "admin12"), an email address, a network address, or the like in place of or in addition to the full name. This data structure is linked to the data structure "entity_access_limit_struct" through the attribute "entity_change_initiator." The data structure "entity_access_limit_struct" contains two additional attributes that contain information regarding the access-limiting event: "entity deletion_timestamp" and "entity_restricted_access_timestamp." Both the attributes "entity deletion_timestamp" and "entity_restricted_access_timestamp" have timestamps as attribute values. The timestamp 200501010712 indicates that access to the entity was restricted, such as, for example, by enacting more restrictive access permissions for a substantive knowledge entity or copying a substantive knowledge entity to a more restrictive access area. The timestamp also indicates that the change took place on Jan. 1, 2005 at 7:12 a.m. The time stamp 200501200818 indicates that the entity was later deleted on Jan. 20, 2005 at 8:18 a.m. The attribute "entity_deletion_timestamp" and its attribute value would have been added to data structure "entity_access_limit_struct" after the data structure's initial creation.

An entity may vacillate between restricted and unrestricted access or between several levels of restricted access. In such cases, the attribute "entity_restricted_access_timestamp" may be modified to indicate the most recent occurrence of restricted access. Alternatively, multiple instances of restricted access timestamp may be recorded. In some instances, only specific types of restricted access may be recorded. Methods of implementing each of these alternatives are well known to those of skill in the art.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for management of federated information in associated knowledge systems, the method comprising:
   maintaining a data structure, the data structure including associative metadata that correlates a plurality of substantive knowledge entities from a plurality of disparate knowledge bases;
   monitoring for an access-limiting event on at least one of the substantive knowledge entities, wherein the access-limiting event is an event that indicates access to the substantive knowledge entity is being curtailed;
   determining the access-limiting event on at least one of the substantive knowledge entities; and
   responsive to determining the access-limiting event, adding to the associative metadata a persistent audit enhancement indicative of the access-limiting event, the persistent audit enhancement including a timestamp indicating when the access-limiting event occurred.

2. The method of claim 1 wherein the access-limiting event comprises deletion of the at least one of the substantive knowledge entities.

3. The method of claim 1 wherein the access-limiting event comprises enacting more restrictive access permissions for the at least one of the substantive knowledge entities.

4. The method of claim 2 wherein the access-limiting event comprises copying of the at least one of the substantive knowledge entities to a more restrictive access area, wherein copying of the at least one of the substantive knowledge entities occurs prior to deletion of the at least one of the substantive knowledge entities.

5. The method of claim 1 wherein the persistent audit enhancement further comprises information identifying a user enacting the access-limiting event, wherein the information identifying the user is a network address.

6. The method of claim 1 wherein maintaining the data structure comprises persistently maintaining a portion of the associative metadata that correlates a plurality of particular substantive knowledge entities after deletion of one or more of the plurality of particular substantive knowledge entities.

7. The method of claim 1 wherein the data structure is maintained remotely from the disparate knowledge bases.

8. A computer usable medium including computer readable code for management of federated information in associated knowledge systems, the medium comprising:
   computer readable code for maintaining a data structure, the data structure including associative metadata that correlates a plurality of substantive knowledge entities from a plurality of disparate knowledge bases;
   computer readable code for monitoring for an access-limiting event on at least one of the substantive knowledge entities, wherein the access-limiting event is an event that indicates access to the substantive knowledge entity is being curtailed;
   computer readable code for determining the access-limiting event on at least one of the substantive knowledge entities; and
   computer readable code for adding to the associative metadata a persistent audit enhancement indicative of the access-limiting event responsive to determining the access-limiting event, the persistent audit enhancement including a timestamp indicating when the access-limiting event occurred.

9. The computer usable medium of claim 8 wherein the access-limiting event comprises deletion of the at least one of the substantive knowledge entities.

10. The computer usable medium of claim 8 wherein the access-limiting event comprises enacting more restrictive access permissions for the at least one of the substantive knowledge entities.

11. The computer usable medium of claim 9 wherein the access-limiting event comprises copying of the at least one of the substantive knowledge entities to a more restrictive access area, wherein copying of the at least one of the substantive knowledge entities occurs prior to deletion of the at least one of the substantive knowledge entities.

12. The computer usable medium of claim 8 wherein the persistent audit enhancement further comprises information identifying a user enacting the access-limiting event wherein the information identifying the user is a network address.

13. The computer usable medium of claim 8 wherein computer readable code for maintaining the data structure comprises computer readable code for persistently maintaining a portion of the associative metadata that correlates a plurality of particular substantive knowledge entities after deletion of one or more of the plurality of particular substantive knowledge entities.

14. A system for management of federated information in associated knowledge systems, the system comprising:
   a processor;
   a computer memory operatively coupled to the computer processor; and
   a communications adapter operatively coupled to said processor and said computer memory, said communications adaptor for connecting the system through a network to a plurality of disparate knowledge bases storing a plurality of substantive knowledge entities;
   wherein the computer memory has disposed within it computer program instructions for maintaining a data structure, the data structure including associative metadata that correlates the plurality of substantive knowledge entities from the plurality of disparate knowledge bases; and
   computer program instructions for adding to the associative metadata a persistent audit enhancement indicative of an access-limiting event responsive to a determination of the access-limiting event on at least one of the substantive knowledge entities, the persistent audit enhancement including a timestamp indicating when the access-limiting event occurred, wherein the access-limiting event is an event that indicates access to the substantive knowledge entity is being curtailed.

15. The system of claim 14 wherein the computer memory has further disposed within it:
   computer program instructions for monitoring for the access-limiting event on at least one of the substantive knowledge entities; and
   computer program instructions for determining the access-limiting event on at least one of the substantive knowledge entities.

16. The system of claim 14 wherein the access-limiting event comprises deletion of the at least one of the substantive knowledge entities.

17. The system of claim 14 wherein the access-limiting event comprises enacting more restrictive access permissions for the at least one of the substantive knowledge entities and copying of the at least one of the substantive knowledge entities to a more restrictive access area.

18. The system of claim 14 wherein the persistent audit enhancement further comprises information identifying a user enacting the access-limiting event.

19. The system of claim 14 wherein computer program instructions for maintaining the data structure comprises computer program instructions for persistently maintaining a portion of the associative metadata that correlates a plurality of particular substantive knowledge entities after deletion of one or more of the plurality of particular substantive knowledge entities.

20. The system of claim 14 wherein the system is remote from the disparate knowledge bases.

* * * * *